United States Patent [19]
Wright et al.

[11] Patent Number: 5,272,441
[45] Date of Patent: Dec. 21, 1993

[54] TRANSMISSION SYSTEM SOLENOID CONTROLLED ACTUATOR FAULT DETECTION SYSTEM AND METHOD

[75] Inventors: Keith Wright; Paul M. Fowler, both of Preston; Kwok W. Chan, Chorley; John S. Tuson, Leyland, all of England

[73] Assignee: Eaton Corporation, Cleveland, Ohio

[21] Appl. No.: 669,241

[22] Filed: Mar. 14, 1991

[30] Foreign Application Priority Data
Mar. 17, 1990 [GB] United Kingdom ............ 9006091

[51] Int. Cl.⁵ ............................................ G01R 31/06
[52] U.S. Cl. ................................ 324/546; 324/418; 324/422
[58] Field of Search ............... 324/415, 418, 422, 423, 324/546, 537

[56] References Cited

U.S. PATENT DOCUMENTS

| | | | |
|---|---|---|---|
| 4,445,393 | 5/1984 | Braun | 74/346 |
| 4,595,986 | 6/1986 | Daubenspeck et al. | 364/424 |
| 4,676,115 | 6/1987 | Morscheck et al. | 74/475 |
| 4,722,237 | 2/1988 | McNinch, Jr. | 74/346 |
| 4,764,884 | 8/1988 | Noyori | 324/422 X |
| 4,936,156 | 6/1990 | Peterson et al. | 74/335 |
| 4,961,051 | 10/1990 | Tjebban | 324/418 X |
| 5,153,522 | 10/1992 | Sano | 324/546 |

FOREIGN PATENT DOCUMENTS

0054977  3/1984  Japan ...................... 324/418

Primary Examiner—Kenneth A. Wieder
Assistant Examiner—Glenn W. Brown
Attorney, Agent, or Firm—H. D. Gordon

[57] ABSTRACT

Open-circuit and closed-circuit faults in a solenoid controlled actuator are detected using shunt resistors (R1, R4) across the solenoid (1), a transistor switch (4), and a voltage monitor (7) and/or (14) across one or both of these which can detect a faulty open-circuit solenoid that is not energized, or a faulty closed-circuit solenoid that is energized. According to the present invention, before each change in actuator position, the solenoids are all caused to assume an opposite energization condition for a period of time insufficient to move the actuator, but enough to check the voltage monitor responses. In this way, both open and closed circuit faults are detected.

16 Claims, 4 Drawing Sheets

TRANSMISSION SYSTEM SOLENOID CONTROLLED ACTUATOR FAULT DETECTION SYSTEM AND METHOD

BACKGROUND OF THE INVENTION

Related Applications

This Application claims priority under 35 USC 119 from British Application No. 9006091.4 filed Mar. 17, 1990.

Field of the Invention

The present invention relates to solenoid controlled actuators for a vehicular automated or semi-automated change gear transmission system and in particular to a control system and/or method for sensing faulty solenoid controlled actuators for transmission systems and for responding to sensed solenoid controlled actuator faults.

Description of the Prior Art

Automatic and semi-automatic transmission systems using a plurality of actuators to shift the main and/or auxiliary sections, to operate the master clutch, to operate an engine brake, and the like are known in the prior art. Examples of such automatic and semi-automatic transmission systems may be seen by reference to U.S. Pat. Nos. 4,361,060; 4,445,393; 4,648,290; 4,676,115; 4,722,237; 4,722,248; 4,748,863; 4,928,544 and 4,936,156, the disclosures of all of which are hereby incorporated by reference.

Controls for automated and semi-automated transmission systems, including fault detection systems and/or methods, are known in the prior art as may be seen by reference to U.S. Pat. Nos. 4,595,986; 4,702,127; 4,922,425; 4,888,577 and 4,849,899, the disclosures of which are hereby incorporated by reference.

It is also known to use solenoid controlled actuators to reduce the forces required to operate manually controlled transmissions by relaying a drivers manual gear selection into actual corresponding movement of jaw clutches, friction clutches or the like.

This invention is applicable to all forms of transmission systems where gear selection components are moved via a solenoid controlled actuator in series with a voltage source and a solid state switch, e.g. a bi-polar transistor switch. Eaton Corporation, Assignee of this invention, and its European subsidiaries are developing a fully automatic transmission and market a semi-automatic transmission (called the "SAMT"), using six solenoids in a shift actuator (sometimes called "X-Y shifters") to move the jaw clutches of a main transmission section, and two further solenoids to move those of a splitter, auxiliary section. Such a transmission and solenoid controlled shifter is described in above-mentioned U.S. Pat. Nos. 4,648,290 and 4,928,544.

Further solenoids or other transducers may be involved in gear-changes, to actuate a main clutch, or to override auxiliary braking systems.

Typically, such solenoid controlled actuators involve a two position solenoid controlled valve which is effective to fluidly connect a chamber of a piston/cylinder device to either a source of pressurized fluid or to an exhaust. Typically, the valve is biased into a first position and energization of the solenoid will cause a valving member, such as a spool, to move against the bias into a second position. Actuators of this general type are, of course, well known in the prior art.

If these solenoids, or their wirings, fail electrically, ohmic resistances or currents taken will alter perceptibly, up or down.

When a transducer is faulty, it should be rapidly made manifest to the operator, e.g. some form of alarm in a driver's cab; preferably the specific faulty transducer should be selectably indicated. Also some safe form of recovery logic and action should be initiated. This will minimize the possibility of the transmission behaving in an unintended manner and will notify the operator that corrective action is required.

The detection of current taken by the solenoids is relatively complicated. However, if a voltage source needs to be applied via a respective solid state semiconductor switch to a particular solenoid, it is relatively easy electrically to check if a high voltage, i.e. nearly all the voltage of the source, is developed across the switch, e.g. across of switching control transistor (4) in series with the transducer (1). If so, the transducer will have a short or close-circuit defect. However, whether it is defectively open, or merely normally resistive, will be difficult or impossible to detect, because in either case the switch will develop almost no voltage across itself.

On the other hand, if a particular solenoid (1) is scheduled not to participate in a given change, it can easily be checked for open circuit by shunting it with a resistor (R1) of low value compared with a likely open circuit defect of the transducer (1), but of high value compared with a likely closed circuit defect thereof, and shunting the switch (4) with (additional to a voltage measurer 7) a resistance element (R4) of high value compared with the ON resistance, but of low value compared with the OFF resistance of the switch, and of the same general order as the normal (nondefective) resistance of the transducer (1).

However, an open circuit defect of the transducer will only be apparent if it is meant to be deenergized by the OFF condition of the switch. If it is meant to be energized, either its normal or its open circuit resistance is high compared with the switch resistance, so that virtually no voltage would appear across the controlled ON transistor.

In other words, by measuring voltage across the device, an open-circuit defect can only be detected in a solenoid intended to be deenergized (inactive) and a short or close-circuit defect can only be detected in a solenoid intended to be active (energized).

Although such a 50% test as the above, repeated for every shift, namely successively proving that every energized solenoid is not closed or shorted, and that every unenergized solenoid is not open, is over a period finally indicative of the condition of all solenoids; it is highly desirable to check all transducers more thoroughly and more rapidly, in view of the mechanical or personal dangers in an erroneous selection of an unexpected gear speed or even direction. For instance, a driver may travel along a straight and level, but roughish road for four hours in top-gear, and solenoid leads may work loose through vibrations for this period. It would be a good thing if all solenoids could at least be checked before the next downshift.

SUMMARY OF THE INVENTION

Accordingly, the present invention which applies to any suitable transducer assisted (e.g. solenoid assisted)

mechanical shift transmission; includes the feature that, after a shift has been requested from a gear designated by an old code of solenoid energizations to a gear designated by a new one, the old code is annulled, then an auxiliary code which is the exact inverse (i.e. opposite ON for OFF, OFF for ON) of said new code is applied to the solenoids for insufficient power and/or duration (e.g. 20 millisec.) to drive the transducers. The auxiliary inverted code is used during this period for a part-verification of the solenoids and is then annulled, and the new code applied normally and the remainder of the verification of the transducers proceeds as per the prior art.

Such auxiliary or testing voltage or pulse must be of smaller power or of much smaller duration than that required to energize and move the solenoid at all and, of course, the check depends on the fact that the solenoids and gears have considerable mechanical inertia, are not mechanically biassed and stay in the position they are driven to by fully energized solenoid(s). However, the solenoid has electrical inertia (inductance) and the duration must be sufficient for a steady current to be obtained. By way of example, it has been found that a period of about 20 milliseconds is sufficient to test the solenoids for open or closed circuit faults while a period of about 100 milliseconds is required to cause any response from the solenoids or the actuators controlled thereby.

Accordingly, it is an object of the present invention to provide a method/system for testing for both open circuit and closed circuit defects in solenoid controlled actuators associated with transmission systems. This and other objects and advantages of the present invention will become apparent from a reading of the description of the preferred embodiment in view of the drawings.

DESCRIPTION OF THE PREFERRED EMBODIMENT

Figure 2:
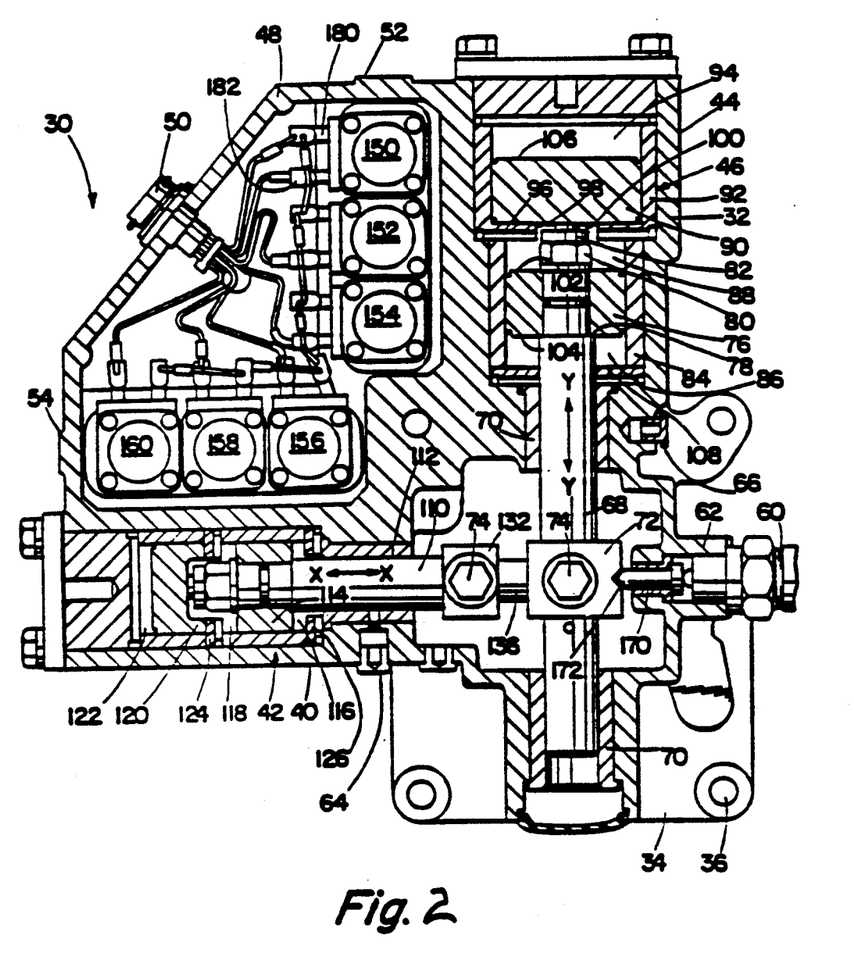
FIG. 2 is a top view of a typical X-Y shifting mechanism utilizing solenoid controlled actuators.
Figure 3:
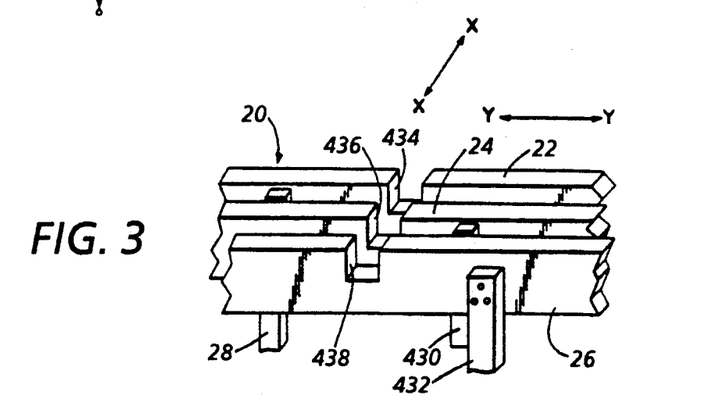
FIG. 3 is a schematic illustration of a portion of mechanical transmission shift bar housing assembly of the type suited for control with an X-Y shifting mechanism.
Figure 4:
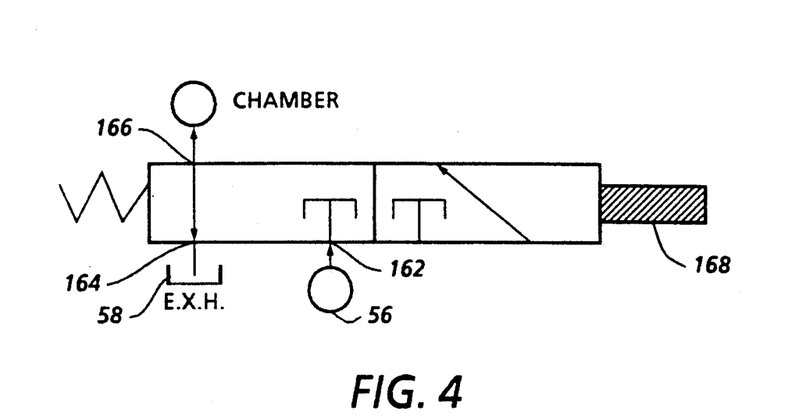
FIG. 4 is a schematic illustration of a typical three-way two-position solenoid controlled valve advantageously utilized in the X-Y shifting mechanism of FIG. 2.

FIGS. 2-4, illustrate a typical X-Y type transmission shifting mechanism as described and illustrated in above-mentioned U.S. Pat. No. 4,899,607 (also EP-A2-315 347).

Automatic and semi-automatic mechanical transmissions based upon generally standard mechanical transmissions provided with electric/pneumatic actuators controlled by a control unit are well known in the prior art as may be seen by reference to U.S. Pat. Nos. 4,648,290 and 4,361,060, the disclosures of which are hereby incorporated by reference.

Figure 5:
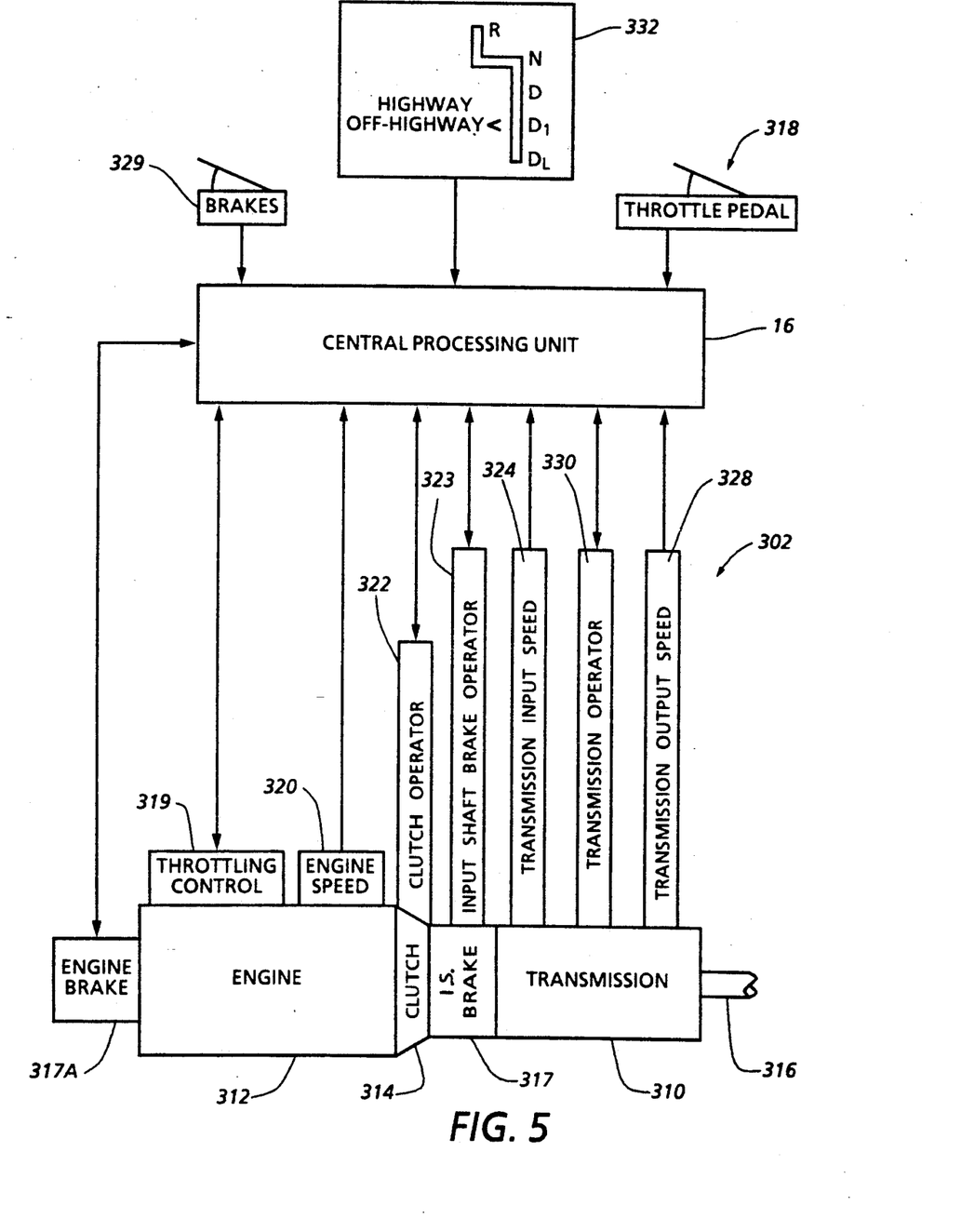
FIGS. 5 and 6 are schematic illustrations of an automated transmission system, and system controller, respectively.

As is well known in the prior art, see for example above-mentioned U.S. Pat. Nos. 4,959,986, 4,361,060 and 4,648,290, a typical automated mechanical transmission system 302, see FIGS. 5 and 6, includes a mechanical change gear transmission 310, an engine 312, a master friction clutch 314, an output shaft 316 extending from the transmission and an upshift brake such as input shaft brake 317 and/or an engine brake 317A. An operator throttle pedal 318, an engine speed sensor 320, an input shaft speed sensor 324, and output shaft speed sensor 328, the transmission operator or shifting mechanism 30, a brake pedal sensor 329, a shift mode selector 332 and/or other devices provide input signals to a central processing unit 16, preferably microprocessor based, which processes the signals 17 according to predetermined logic rules, look-up tables, etc. to issue command output signals 18 to various operators such as transmission operator 30, throttle controls 319, clutch operator 322 and upshift brake operators 317/317A.

Figure 6:
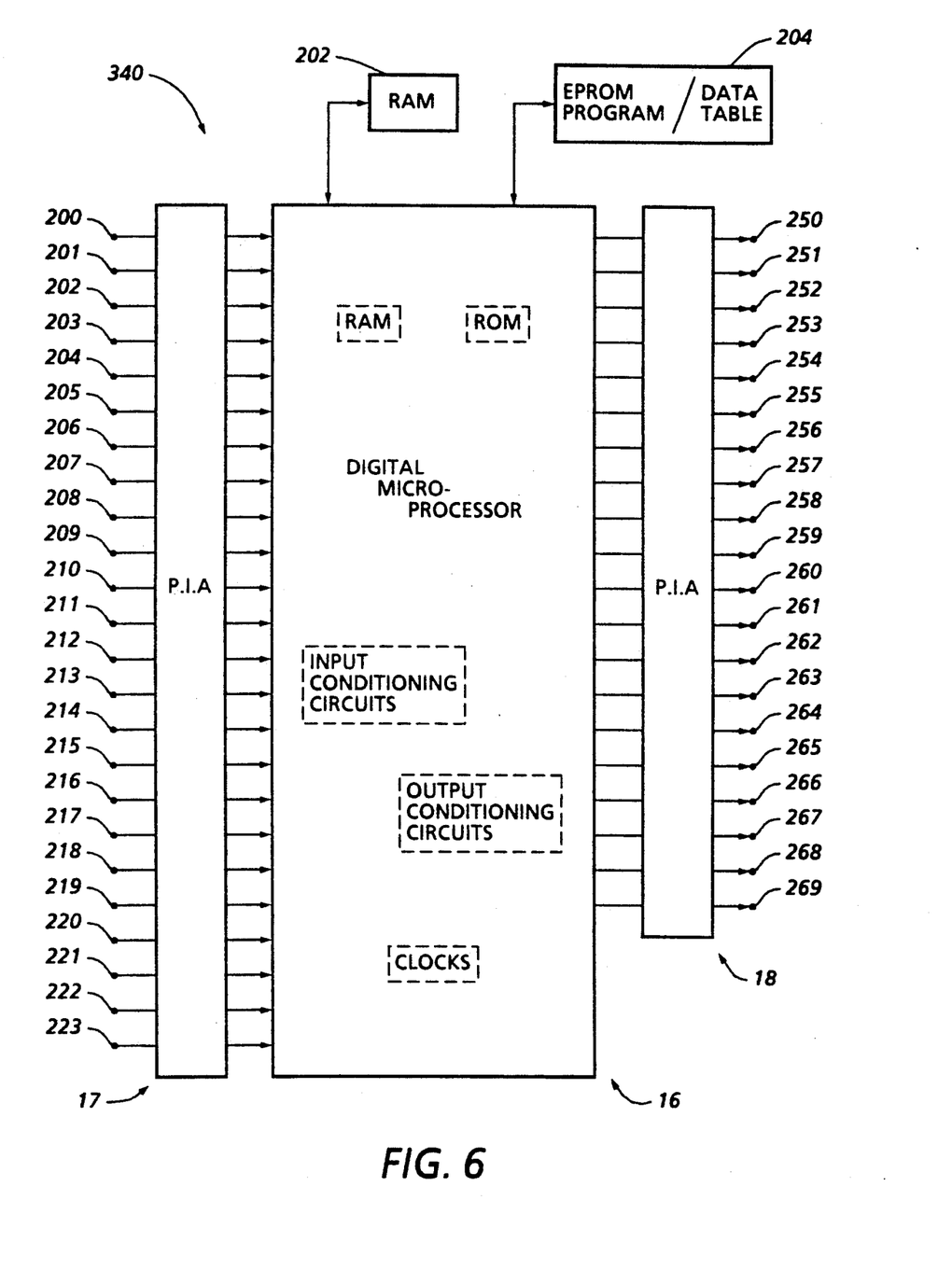

The CPU 16, see FIG. 6, includes a digital microprocessor of sufficient capability and capacity. In addition to the power and other enabling inputs (not shown) the illustrated microprocessor utilizes twenty-four input interfaces or connections, 200l4 223, and twenty output connections, 250-269.

In addition to the microprocessor, the controller 16 may also include a random access memory (RAM) 202 and a read only memory (ROM), which may be an erasable programmable read only memory (EPROM) 204 in which is stored the program and the data or look-up table defining the various shift point profiles and the like.

Such transmissions typically included a shift bar housing assembly, an example of which may be seen schematically in FIG. 3. The shift bar housing assembly 20 typically comprises a plurality of axially movable shift rails, 22, 24 and 26, each of which carry a shift fork 28, 430, 432, respectively, fixed thereto for axial movement therewith. As is well known, the shift forks are each associated with a positive clutch mechanism for selectively engaging/disengaging a first and/or a second gear to a shaft.

Typically, shifting of such transmissions is accomplished by selecting a shift rail by moving an engagement member such as a shift finger axially or pivotably along the axis X—X into alignment with a shift block or notch 434, 436 or 438 carried by the selected shift rail and then causing axial movement of the selected shift rail by axially moving or pivoting the shift finger to apply an axial force in the direction of axis Y—Y.

X-Y shifting mechanism 30 is enclosed within a housing 32 having a mounting plate portion 34 with bolt bores 36 in a pattern allowing the mechanism 30 to be mounted at the upper opening in a transmission shift bar housing normally receiving the shift tower. A shift finger extends downwardly from housing 32 for interaction with the shift rails.

Housing 32 includes a portion 40 enclosing the select piston/cylinder assembly 42 for moving shift finger, axially or pivotably in the direction of line X—X for selection of a selected shift rail 22, 24 or 26; and a transversely extending portion 44 enclosing piston/cylinder assembly 46 for moving shift finger 38 in the direction of Y—Y to cause axial movement of the selected shift rail and its associated shift fork for engaging or disengaging a selected transmission ratio gear. As is illustrated in FIG. 2, piston/cylinder assembly 46 is larger than piston/cylinder assembly 42 as moving shift finger 38 in the engagement, i.e. Y—Y, direction requires greater force than moving shift finger 38 in the selection, i.e. X—X, direction. Housing 32 also includes a valving portion 48 defining a single multiple pin electric connector 50, a single inlet 52 for connection to a source of pressurized fluid, such as a regulated, dried filtered connection to the onboard vehicle air system, and a pressurized fluid exhaust to atmosphere 54. The valving portion 48 also contains the valves to controlling the X—X and Y—Y piston/cylinder assemblies, 42 and 46, respectively, a common pressurized fluid gallery 56 fluidly connected to inlet 52 and a common exhaust gallery 58 fluidly connected to the exhaust outlet 54. Housing 32 also defines a connector 60 for a neutral position sensor 62 and a pair of breather plugs 64 and 66 for the piston/cylinder assemblies. Other vent or breather plugs may be provided as necessary.

The engagement/disengagement assembly 46 for moving the shift finger in the Y—Y axial direction comprises a shaft 68 supported as at sleeve bushings 70 for axial movement in the Y—Y direction, and pivotal movement, relative to housing 32. The shift finger is integral with a shift finger carrier 72 axially and rotationally fixed to shaft 68 as by set screw 74.

Adjacent its upper end, a piston 76 is axially fixed to shaft 68 between a shoulder 78 and a nut and washer 80 retained on threaded upper extension 82 of shaft 68. Piston 76 is slidably and sealingly received within cylinder member 84 to define sealed chambers 86 and 88. A piston 90 is slidably and sealingly received within a cylinder member 92. The piston 90 and cylinder 92 define a sealed chamber 94 above the piston. Downward axial movement of piston 90 is limited by washer shaped stop member o6 having a center opening 98 allowing the lower surface 100 of piston 90 to fluidly communicate with and define chamber 88 and to contact extension 82 of shaft 68. Surface 100 of piston 90 will contact shaft 68 extension 82 when piston 90 is in its lowest most position and shift finger carrier 72 and shift finger 38 are in the neutral or axially nondisplaced condition as illustrated in FIG. 3. Piston 76 defines an upper and a lower surface 102 and 104, exposed to a pressure in chambers 88 and 86, respectively, which are smaller than the upper surface 106 and lower surface 100 of piston 90 exposed to fluid pressure in chambers 94 and 88, respectively. While surface 106 is equal in area to surface 100, at times when piston surface 100 is engaging stop member 96 or extension 82, the effective area of surface 106 exceeds that of surface 100.

The piston/cylinder assembly 46 allows shaft 68 to assume any selected one of three selectable axial positions, namely axially centered as illustrated in FIG. 3, an upward axial displacement wherein surface 102 will contact stop member 96 and a downward axial displacement wherein surface 104 contacts a stop member 108. The upward and downward displacements are selected in view of the required axial displacements of shift rails and associated shift forks to cause engagement and disengagement of transmission ratio gears.

To cause shaft 68 to assume its axially nondisplaced neutral position, chambers 94 and 86 are pressurized while chamber 88 is exhausted. To cause shift 68 to be displaced axially downwardly, chambers 88 and 94 are pressurized while chamber 86 is exhausted. It is noted that chamber 94 could be exhausted to achieve the same but somewhat slower downward displacement. To cause upward axial displacement of shaft 68, chamber 86 is pressurized while chambers 88 and 94 are exhausted.

Movement of shaft finger 38 in the X—X direction to align the shift finger with a selected shift rail is accomplished by selective axial positioning of shaft 100 which is slidably supported in housing 32 as by bushing 112 for movement substantially perpendicular to the axial movement of shaft 68. Except for being somewhat smaller in size, shaft 110 and its associated piston/cylinder assembly 42 is substantially functionally and structurally identical to that of shaft 68 and associated piston/cylinder assembly 46 described above.

Briefly, piston 114 is fixed to shaft 10 and defines sealed chambers 116 on 118 on the right and left faces, respectively, thereof. A larger piston for contact with a leftwardly extending extension of shaft 110 has a rightwardly facing surface exposed to pressure in chamber 118 and a leftwardly facing surface defining and exposed to fluid pressure in sealed chamber 122.

A first washer shaped stop member 124 limits rightward axial movement of piston 120 and leftward axial movement of piston 114. Stop member 126 limits rightward axial movement of piston 114.

A crank mechanism for pivoting shift finger in the X—X direction is controlled by shaft 110. A crank connector 132 is attached to shaft 110 as by set screw 134. The crank connector 132 includes a portion 136 axially offset but substantially parallel to shaft 110. Portion 136 defines a slot for receipt of a generally bulbulous portion defined by the shift finger carrier to define a ball and slotted socket type connection. The carrier 72 and shift finger 38 are thus a crank lever, pivotably movable about the axis 142 of shaft 68.

In the axially centered position of shaft 110 shown in FIG. 2 the shift finger will align with the shift block 26 of shift rail 14. Movement of shaft 110 rightwardly will cause the shift finger to pivot to the position for alignment with shift block 28 of shift rail 16. Movement of shaft 110 leftwardly will cause the shift finger to pivot to the position to align with shift block 24 of shift rail 12.

Pressurization of chambers 122 and 116 and exhaust of chamber 118 will cause shaft 110 to assume the axially centered position of FIG. 2. Pressurization of chamber 118 will cause shaft 110 to assume the axially centered position of FIG. 2. Pressurization of chamber 118, and preferably chamber 122, and exhaust of chamber 116 will cause shaft 110 to be axially displaced rightwardly. Pressurization of chamber 116 and exhaust of chambers 118 and 122 will cause shaft 110 to be displaced axially leftwardly.

Pressurization and exhaust of each of the individual chambers 94, 88, 86, 118 and 122, respectively, is controlled by one of the three-way, two-position solenoid controlled valves 150, 152, 154, 156, 158 and 160, respectively. The valves, as illustrated in FIG. 4, are of a standard type having a first port 162 connected to a common gallery 56 of pressurized fluid supplied by single-inlet connection 52, a second port 164 connected to common exhaust gallery 58 and a third port 166 connected to the individual chamber controlled by the valve. The valve is normally in the chamber exhaust position and, by action of the solenoid 168, is movable to the chamber pressurization position. Control of the various operating solenoids for the valves 150, 152, 154, 156, 158 and 160 is by the single electrical connector 50.

As may be appreciated, each of the selectable ratios, namely the drive ratios and the neutral positions, will have a specific pattern of on and off, i.e. energized and deenergized, solenoids associated therewith.

Figure 1:
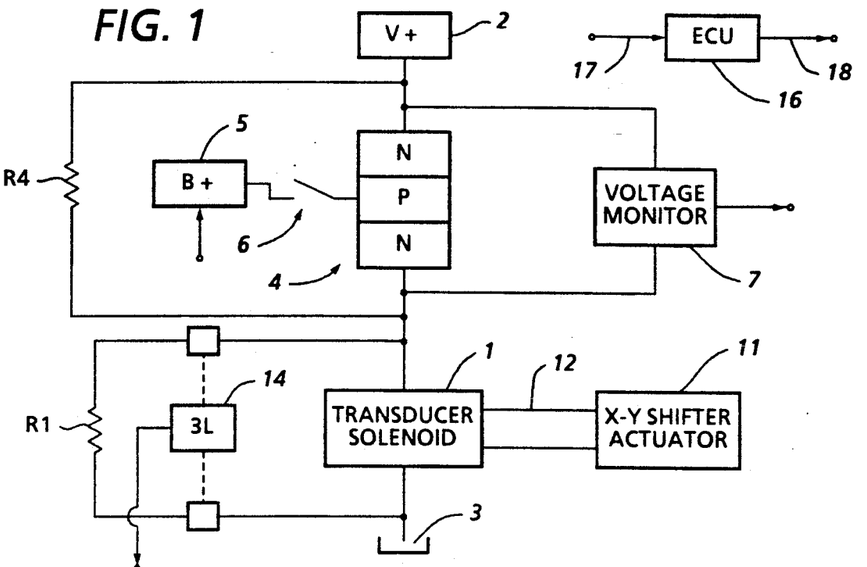
FIG. 1 is a schematic circuit diagram of a circuit for implementing the system/method of the present invention.

Referring to FIG. 1, there is shown, shunted by a resistor R1, a transducer solenoid 1, which may drive a fluid valve for controlling the pressurization and exhaust of a piston/cylinder chamber of an X-Y shifter 11 via a mechanical link 12 for some of its routines (as described, for instance, in EP-A2-315 347, aforementioned). Alternatively, the solenoid 1 and actuator 11 may control a clutch actuator, an engine brake or an upshift brake. A voltage source 2 is continuously applied to a ground terminal 3 via, in series, the solenoid and, shunted by a resistor R4, a bipolar power transistor 4 that can take the maximum solenoid normal amperage. The bipolar can be switched conductive or nonconductive by alternative, high or low, base emitter bias potentials from, e.g. a source 5 and a switch 6, whenever the solenoid is to be energized or not. A monitoring or measuring device 7 determines whether a high, low, or a medium voltage appears across the emitter/collector of the transistor, alternatively, the voltage could be monitored across the solenoid by voltage monitor 14.

Provided that the solenoid is not energized by the switch, the entire V+ of source 2 should appear across the bipolar, unless the solenoid is open circuit defective. If the solenoid is short circuit defective, the entire V+ will again appear across transistor 4 when in its OFF condition, so that a shorting defect is undetectable by the arrangement shown, which is a diagrammatic representation of a normal use of the solenoid. Therefore monitor 7 can only discover an open circuit solenoid soon after Switch 4 is turned off, or maintained off, at the beginning of a shift initiation. This is because V+ will be simply potential-divided by the R4 and R1 values, and the potential divided value $R4.V+/(R4+R1)$ is easily distinguishable by monitor 7 from the entire V+ referred to above.

If the base of bipolar 4 is switched on by source 5, its impedance and, hence, its developed voltage goes to virtually zero and virtually all of V+ should appear across the solenoid (to operate it). If the solenoid is open circuit defective, zero volts will still be monitored at 7 across Switch 4, and this defect will be undetectable. If the solenoid is short circuit defective, the voltage across the bipolar will tend to become substantial, and the condition is immediately detectable.

Hence, only some solenoids can be detected as defective at the beginning of any shift, i.e. without the shorted ones if they are to be energized for the shift, and the open ones if they are to be deenergized for the shift.

Accordingly, the present invention which applies to any suitable transducer assisted (e.g. solenoid assisted) mechanical shift transmission; includes the feature that, after a shift has been requested, from a gear designated by an old code of solenoid energizations to a gear designated by a new one, the old code is annulled, then an auxiliary code which is the exact inverse, i.e. opposite (ON for OFF, OFF for ON) of said new code is applied to the solenoids for insufficient power and/or duration (e.g. 20 millisec) to drive the transducers. The auxiliary inverted code is used during this period for a part-verification and is then annulled, and the new code applied normally and the remainder of the verification of the transducers proceeds as for the prior art.

Thus, if the new seven figure code for a main box, auxiliary (splitter) box and upshift brakes, etc., is 1101001, the auxiliary inverted code applied for (20 ms) would be 0010110. Such auxiliary or testing voltage or pulse must be of smaller power or of much smaller duration than that required to energize and move the solenoid at all and, of course, the check depends on the fact that the solenoids and gears have considerable mechanical inertia, are not mechanically biassed and stay in the position they are driven to by fully energized solenoid(s), until they are driven away from that position by another energized solenoid(s). However, the solenoid has electrical inertia (inductance) and the duration must be sufficient for a steady current to be obtained.

The invention teaches, therefore as an important feature, that the preparatory or auxiliary application of the opposite conditioning (having regard to the shift in question) in a nonshifting or nondriving manner of each solenoid for a short period before, i.e. preparatory to the normal driving energization for that shift. The required shift energization pattern is thus reversed for the short preparatory period.

The short period is 10–20 millisec. or something long compared with the rise or fall time of the current in the inductive solenoid, but short compared with the time taken to drive the inertia of the solenoid and its attendant shift, clutching, or braking parts. A refinement could be additionally to investigate the rise or fall time of the solenoid current, because the inductance and hence this time would generally reduce with shorted turn defects. The bipolar can be any three electrode device, such as a controlled rectifier, but its impedance should not be infinite when high.

Although it is possible to use only one voltage monitor 7 across one of the two series components 1 and 4 as shown, it is often preferred to use a voltage monitor across both components, as shown. That across the transducer is shown at 14 with dotted line connections. If the voltage V+ at 2 is stable and connections therefrom are also reliable and steady, the voltage across the other component of 1 and 4 can always be obtained by subtraction. However, especially with an open circuit solenoid 1, the voltage becomes appreciable and sometimes variable. On balance, it is recommended to use the second voltage monitor 14 as shown.

R4 should have resistance value intermediate the ON and OFF resistances exhibited by Switch 4. R1 should have rather high value compared with the normal resistance of the transducer. R4 should also be somewhere of the general order of R1 and high enough not to allow driving current to the transducer when the transistor 4 if OFF. Otherwise sensitivity reduces as these conditions are not met.

Accordingly, the invention in its broadest aspect features a group of transducers (1) for driving mechanical function actuators (such as shifters and brakes), which transducers are enabled according to plural required conditions (e.g. shift ratios 1-12) in respective patterns of energization and deenergization, and means to oppositely enable each transducer for a short, nonfunctional period of time before a normal enabling pattern, i.e. each transducer to be energized for a given shift is preparatorily deenergized and vice-versa, but any such preparatory energization is insufficient for driving a said actuator.

As disclosed in above-mentioned U.S. Pat. Nos. 4,361,060 and 4,595,986, a control unit, preferably a microprocessor based ECU 16, having timing devices may be provided for receiving inputs 17, including input signals from voltage monitors 7 and 14, for processing the inputs (usually including signals indicative of various vehicle operating conditions such as vehicle speed, engine speed, transmission shaft speeds and the like) according to predetermined logic rules to issue command output signals 18 to various actuators such as the switch assembly 4, 5, 6 controlling the energization or deenergization of solenoid 1.

The predetermined logic rules used by ECU 16 to generate the appropriate command output signals can include a fault sensing sequence whereby readings from the voltage monitors are compared to expected values at the then commanded state (energized or deenergized) of the solenoid 1 and whereby prior to commanding changing the state of one or more solenoids, as may be required to cause a transmission ratio change, the various solenoids are commanded to the opposite states thereof for the predetermined relatively short period of time. If the sensed voltage readings do not fall within expected ranges for the then commanded state of the solenoid, a fault is detected and appropriate action may be taken.

Preferably an energization source (2) is applied to each respective transducer (1) and a shunting resistor (R1) through a respective high/low current or impedance controlled switching device (4), and the devices are controlled into the opposite current or impedance controlled switching device (4), and the devices are controlled into the opposite current or impedance controlled state for the short initial period of opposite pattern enabling of the transducers compared with the normal enabling pattern for the contemplated mechanical actuation (e.g. selecting fourth gear).

By transducer close circuits is included a mechanical wiring or mounting fault outside the transducer, but effectively acting just as an electrical short circuit within the transducer does. By transducer open circuits is included a nondefective transducer which has become disconnected from circuit, such as a broken lead or terminal, or by nonconductive corrosion.

This procedure will detect, immediately prior to a requested shift, any failed one of solenoids, whether open or shorted. However, it is just possible that a failure could occur actually during the short period of a shift, i.e. after the above verification of the invention in its broad aspect has proceeded without problem. This condition can be detected after scheduled completion of the shift by comparing a ratio-engaged determination for equality with the ratio selected (manually or automatically), and ascertaining whether a predetermined delay has occurred without an equality being determined.

The ratio engaged determination can be a comparison of input shaft speed (IS) to output shaft speed (OS) multiplied by expected gear ratio (GR), see above-mentioned U.S. Pat. No. 4,849,899.

The two following tables respectively show the action taken on problems being detected before, and during, a gear shift. From their inspection, it will be seen, summarizing, that if any gear solenoid fails before a shift, the engaged gear is maintained until the vehicle stops. If a clutch actuator, upshift brake or engine brake solenoid is detected as failed, warning is given, but because their failure is not so critical, gear changes are not prevented. Generically speaking, none of these components have to be actuated with the EATON (Trademark) Twin Splitter (Trademark). These are components of assistance, but their successful operation is not absolutely compulsory for satisfactory changes.

If faults are detected during the first part of a mainbox shift, the system logic attempts to return the mainbox to its starting ratio, but to engage the highest splitter, back box ratio. This latter is in order to reduce chance of an engine overspeed. If solenoid faults are detected during the second part of the shift, engagement of the requested gear is attempted three times. Then, after three failures at this, engagement of the best gear ratio for the instantaneous road speed is attempted repeatedly until the vehicle comes to rest and switch-off.

TABLE I

| Faults Occurring Outside a Shift | |
|---|---|
| Solenoid Group | Fault Logic |
| All Gear Solenoids | All gear requests are ignored. The driver retains throttle control. The display shows correct error code. The driver must stop to rest error status. |
| Clutch Actuator Upshift Brake and Engine Brake Solenoids | The next gear change is performed as normal. On completion, the display shows correct error code for approximately 1 second then returns to normal. |

TABLE II

| Faults Occuring During a Shift | |
|---|---|
| Gear Solenoids used to move front gearbox from gear to neutral | After approximately 1 second, the requested gear is modified to select the gear corresponding to the same front box position just exited in conjunction with the highest auxiliary section ratio. On completion of shift, fault logic is as "All Gear Solenoids" above. |
| Gear solenoids used to move front gearbox from neutral to gear, or back box from gear to gear | Three attempts are made to select the requested gear, after which the Best Gear select routine is initiated. This will select the most appropriate gear for the road speed. On completion of the shift fault logic is as "All Gear Solenoids" above. |

Table II represents the best statistical operation strategy, it is believed, for failures to reach neutral which is an automatically detectable condition (see, for instance, our UK Application GB-8903132.2). Once a shift has been initiated, before a transducer fault is detected, satisfactory corrective, or recovery, action must always be very uncertain. Table II represents the best method currently evaluated by the present inventors. Detectors and, indeed, indicators of what gear ratio is currently engaged are well known.

As to the best method of carrying out the Table I preparatory tests, a power bipolar transistor is preferred, because of the ability to control the collector current by means of base bias, also because emitter-collector current is found adequate to feed a solenoid, and this varies fairly sensitively the voltage developed between the emitter and the collector. Other semiconductive devices may provide adequate sensing of solenoid current by reference to a developed voltage.

As an alternative, especially if the solenoid actuators are utilized in connection with an ECU controlled automatic/semi-automatic transmission system, the condition (ON or OFF) of the solenoids may be periodically reversed to test for potential open-circuit or close-circuit defects.

The term "solenoid controlled actuator" may include the valves controlled by a solenoid and/or the various piston/cylinder assemblies having chambers which are selectively pressurized and exhausted by the valves.

Although this invention has been described with a certain degree of particularity, it is understood that modifications are possible within the spirit and scope of the invention as hereinafter claimed.

We claim:

1. A system for sensing both open-circuit and closed-circuit faults in a solenoid controlled actuator assembly, said actuator assembly having a first condition when said solenoid is energized and a second condition when said solenoid is deenergized, said actuator assembly requiring at least a first period of time to respond to a change in energization of said solenoid by moving from one of said first and second conditions, said actuator assembly including fault sensing means effective for sensing only one of a closed-circuit and open-circuit fault in the solenoid in the energized condition of said solenoid and for sensing only the other of a closed-circuit and open-circuit fault in the solenoid in the deenergized condition of said solenoid, said system characterized by:
   means for determining a selected one of the energized and deenergized conditions for said solenoid,
   means for causing said solenoid to assume the other of the energized and deenergized conditions thereof for a second period of time, said second period of time shorter than said first period of time,
   means for causing said fault sensing means to sense for the one of open-circuit and closed-circuit faults while said solenoid is in said other condition, and
   means effective at the conclusion of said second period of time for causing said solenoid to assume the selected condition thereof.

2. The system of claim 1 further comprising means for causing said fault sensing means to sense for the one of open-circuit and closed-circuit faults detectable by said fault sensing means when said solenoid is in said selected condition after said solenoid has been caused to assume said selected condition thereof.

3. The system of claim 1 or 2 wherein said solenoid is connected in series with a switching member between a voltage, said fault sensing means comprising means to sense the voltage drop across one of said switch and said solenoid.

4. The system of claim 3 wherein said switch is a solid state switch.

5. The system of claim 4 wherein said solid state switch is a bipolar transistor switch.

6. The system of claim 4 further comprising a resistor shunt across said at least one of said switch and solenoid.

7. The system of claim 1 or 2 wherein said first time period is at least twice as long as said second time period.

8. The system of claim 1 or 2 wherein said means for causing said solenoid to assume the other of said conditions will cause said solenoid to assume the other of said conditions prior to issuance of a command to said solenoid to assume said selected condition.

9. A method for sensing both open-circuit and closed-circuit electrical faults in a solenoid controlled actuator assembly, said actuator assembly having a first condition when said solenoid is electrically energized and a second condition when said solenoid is electrically deenergized, said actuator assembly requiring at least a first period of time to respond to a change in energization of said solenoid by moving from one of said first and second positions toward the other of said first and second positions, said actuator assembly including fault sensing means effective for sensing only one of a closed-circuit and open-circuit fault in the solenoid in the energized condition of said solenoid and effective for sensing only the other of a closed-circuit and open-circuit fault in the solenoid in the deenergized condition of said solenoid, said method characterized by:
   determining a desired actuator assembly position corresponding to a selected one of the energized and deenergized conditions for said solenoid;
   causing said solenoid to assume the other of the energized and deenergized conditions thereof for a second period of time, said second period of time shorter than said first period of time;
   during said second period of time, causing said fault sensing means to sense for the one of open-circuit and closed-circuit faults detectable by said fault sensing means when said solenoid is in said other condition, and
   at the conclusion of said second period of time, causing said solenoid to assume the selected condition thereof.

10. The method of claim 9 further comprising while said solenoid is in the selected condition thereof, causing said fault sensing means to sense for the one of open-circuit and closed-circuit faults detectable by said fault sensing means when said solenoid is in said selected condition.

11. The method of claim 9 or 10 wherein said solenoid is connected in series with a switching member across a voltage, said fault sensing means comprising means to sense a voltage drop across one of said switch and said solenoid.

12. The method of claim 11 wherein said switch is a solid state switch.

13. The method of claim 12 wherein said solid state switch is a bipolar transistor switch.

14. The method of claim 11 wherein said actuator further comprises a resistor shunt across said at least one of said switch and solenoid.

15. The method of claim 9 or 10 wherein said first time period is at least twice as long as said second time period.

16. The method of claim 9 or 10 wherein said step of causing said solenoid to assume the other of said conditions will occur prior to issuance of a command to said solenoid to assume said selected condition.

* * * * *